(12) United States Patent
Yilmazer et al.

(10) Patent No.: US 10,277,380 B2
(45) Date of Patent: Apr. 30, 2019

(54) CONFIGURABLE BIDIRECTIONAL TRANSCEIVER FOR FULL-DUPLEX SERIAL LINK COMMUNICATION SYSTEM

(71) Applicant: Maxim Integrated Products, Inc., San Jose, CA (US)

(72) Inventors: Caglar Yilmazer, Istanbul (TR); Arda K. Bafra, Istanbul (TR); Umut Yilmazer, Istanbul (TR)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 0 days.

(21) Appl. No.: 15/478,406

(22) Filed: Apr. 4, 2017

(65) Prior Publication Data
US 2017/0295008 A1    Oct. 12, 2017

Related U.S. Application Data

(60) Provisional application No. 62/318,878, filed on Apr. 6, 2016.

(51) Int. Cl.
| | |
|---|---|
| H04L 5/14 | (2006.01) |
| H04L 25/03 | (2006.01) |
| H04B 1/48 | (2006.01) |
| H04L 25/02 | (2006.01) |

(52) U.S. Cl.
CPC ............ *H04L 5/1446* (2013.01); *H04B 1/48* (2013.01); *H04L 5/1461* (2013.01); *H04L 25/0288* (2013.01); *H04L 25/03343* (2013.01); *H04L 25/03878* (2013.01); *H04L 25/03974* (2013.01)

(58) Field of Classification Search
CPC combination set(s) only.
See application file for complete search history.

(56) References Cited

U.S. PATENT DOCUMENTS

| | | | |
|---|---|---|---|
| 6,452,428 B1 | 9/2002 | Mooney et al. | |
| 7,696,787 B2 | 4/2010 | De Araujo et al. | |
| 8,098,602 B2 | 1/2012 | Wu et al. | |
| 8,923,170 B2 | 12/2014 | Yilmazer et al. | |
| 2002/0149402 A1* | 10/2002 | Martin | H03K 19/01721 327/108 |
| 2003/0025541 A1* | 2/2003 | Humphrey | H03K 5/12 327/170 |
| 2010/0073090 A1* | 3/2010 | Mattos | H03F 1/52 330/254 |

* cited by examiner

*Primary Examiner* — Wednel Cadeau
(74) *Attorney, Agent, or Firm* — Kevin E. West; Advent, LLP

(57) ABSTRACT

A configurable transceiver includes a first transmitter, an edge rate controller, a second transmitter, a subtractor, a bandwidth controller and a main controller. The first transmitter is configured to generate a first signal for transmission via a transmission link. The second transmitter is configured to generate a replica signal associated with the first signal. The edge rate controller is communicatively coupled to the first and/or second transmitter and is configured to control an edge rate parameter of the first and/or second signal. The subtractor is configured to subtract the replica signal from a signal received via the transmission link. The bandwidth controller is configured to control a bandwidth parameter of a difference signal received from the output of the subtractor. The main controller chooses edge rate and bandwidth control words per desired link rates. It can also automatically find the maximum possible link speed.

19 Claims, 8 Drawing Sheets

CONFIGURABLE BIDIRECTIONAL TRANSCEIVER FOR FULL-DUPLEX SERIAL LINK COMMUNICATION SYSTEM

CROSS-REFERENCE TO RELATED APPLICATIONS

The present application claims the benefit under 35 U.S.C. § 119(e) of U.S. Provisional Application Ser. No. 62/318,878, filed Apr. 6, 2016, and titled "CONFIGURABLE BIDIRECTIONAL TRANSCEIVER FOR FULL-DUPLEX SERIAL LINK COMMUNICATION SYSTEM," which is incorporated herein by reference in its entirety.

BACKGROUND

Transceivers are employed in a variety of communication systems to transmit and receive signals. For example, transceivers are often used in communication systems including, but not limited to, telecommunication systems, vehicle (e.g., automobile, aircraft, water craft, etc.) communication systems, security systems, sound systems, television broadcasting systems, internet broadcasting systems, sensor systems, control systems, power distribution networks, and so forth. There is a need for transceivers that are operable at different data rates, e.g., for data rate compatibility or to compensate for link quality degradation from attenuation, return loss, aging of a transmission link, and so forth.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Figure 1:
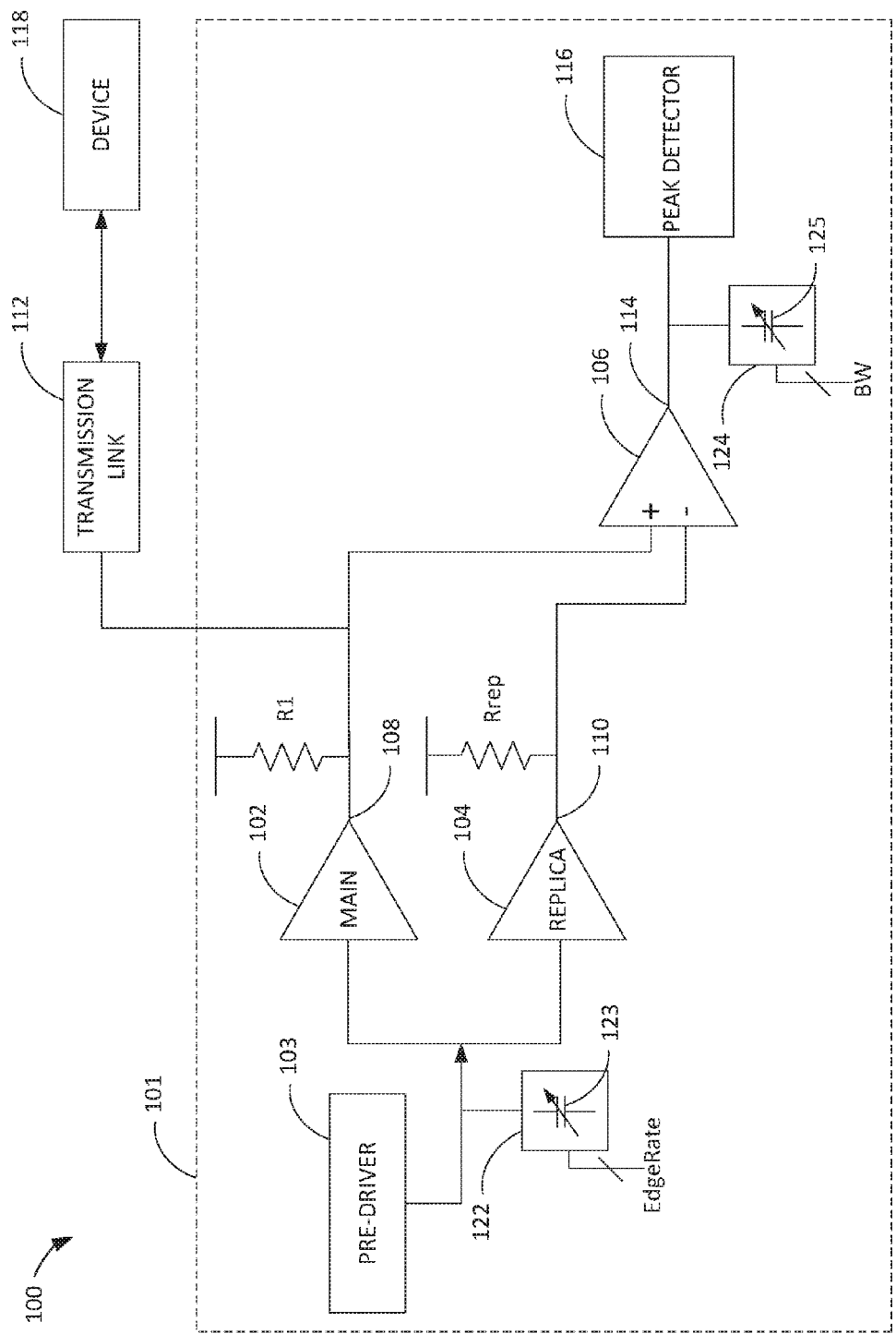
FIG. 1 is a block diagram illustrating a communication system that includes a configurable bidirectional transceiver, in accordance with an example implementation of the present disclosure.

A transceiver is a device that includes a transmitter and a receiver with shared circuitry and/or a shared device structure (e.g., disposed upon the same substrate and/or within a shared housing/enclosure). Transceivers are employed in a variety of communication systems to transmit and receive signals. For example, transceivers are often used in communication systems including, but not limited to, telecommunication systems, vehicle (e.g., automobile, aircraft, water craft, etc.) communication or control systems, security systems, sound systems, television broadcasting systems, internet broadcasting systems, sensor systems, control systems, power distribution networks, and so forth.

Transceivers can be configured to transmit and receive signals over transmission links. Examples of transmission links include, but are not limited to, air (e.g., for wireless transceivers, such as, but not limited to, radio frequency (RF) transceivers, optical transceivers, and the like), single-wire cables, multi-wire cables, coaxial cables, twisted pair cables, optical fiber, and so forth. Many factors, such as, but not limited to, attenuation, return loss, or aging of a transmission link can affect link performance. A transceiver that is operable at different data rates (e.g., different transmitting and/or receiving data rates) can be tuned to improve link performance. In some applications, it is desirable or necessary to establish a communication link between two transceivers in both directions simultaneously. However, it may be undesirable or impossible to increase number of physical links due to cost or space requirements. In such cases, a simultaneous full duplex link can be implemented with bidirectional transceivers.

A configurable transceiver with adjustable transmitting and receiving data rates is disclosed. The configurable transceiver includes a first (main) transmitter, an edge rate controller, a second (replica) transmitter, a subtractor, and a bandwidth controller. The main transmitter is configured to generate a first signal for transmission via a transmission link. The edge rate controller is communicatively coupled to the main transmitter and is configured to control an edge rate parameter of the first signal. The replica transmitter is configured to generate a replica signal associated with the first signal. The subtractor is communicatively coupled to the transmission link and to an output of the replica transmitter. The subtractor is configured to subtract the replica signal from a signal received via the transmission link. In this manner, the subtractor implements receiver functionality of the transceiver. That is, the subtractor performs echo cancellation by subtracting the replica signal (an approximation of the first signal) from the signal received via the transmission link. The subtractor outputs a difference signal that includes an isolated or nearly isolated data signal received via the transmission link (e.g., from another device in communication with the transceiver). The bandwidth controller is communicatively coupled to an output of the subtractor and is configured to control a bandwidth parameter of the difference signal received from the output of the subtractor. In some embodiments, the configurable transceiver may be configured to monitor at least one signal parameter (e.g., peak-to-peak amplitude) of the difference signal output by the subtractor and control edge rate and/or bandwidth parameters of transmitted and received signals based upon the signal parameter.

Example Implementations

FIG. 1 illustrates a communication system 100 in accordance with an embodiment of this disclosure. Examples of the communication system 100 can include, but are not limited to, a telecommunication system, a vehicle (e.g., automobile, aircraft, water craft, etc.) communication or control system, a security system, a sound system, a television broadcasting system, an internet broadcasting system, a sensor system, a control system, a power distribution network, or the like. The communication system 100 includes a configurable transceiver 101 and device 118 communicatively coupled to one another by a transmission link 112 (e.g., air, a single-wire cable, a multi-wire cable, a coaxial cable, a twisted pair cable, an optical fiber, or the like). The device 118 can include any electronic device configured to transmit and/or receive signals. For example, the device 118 can include, but is not limited to, a transceiver, a transmitter, a receiver, a repeater, or the like.

The transceiver 101 and the device 118 can be configured to bi-directionally communicate data signals. For example, the transceiver 101 can be configured to send data signals to the device 118 and receive data signals from the device 118. In such embodiments, the transmission link 112 may simultaneously or substantially simultaneously carry forward channel data (e.g., data signals transmitted by the transceiver 101 to the device 118) and reverse channel data (e.g., data signals transmitted by the device 118 to the transceiver 101). In order to isolate reverse channel data, the transceiver 101 can be configured to subtract the forward channel data or an approximation (e.g., replica, near replica, or scaled version) of the forward channel data from total channel data received via the transmission link 112. As further discussed herein, the transceiver 101 can include a subtractor 106 that implements receiver functionality of the transceiver 101 by subtracting forward channel data or an approximation of the forward channel data from the total channel data received via the transmission link 112 in order to isolate the reverse channel data.

As shown in FIG. 1, the transceiver 101 includes a main transmitter 102 and a replica transmitter 104. The main transmitter 102 is configured to generate a first signal for transmission via a transmission link 112. For example, the main transmitter 102 has an output 108 that is communicatively coupled to the transmission link 112. The replica transmitter 104 is configured to generate a replica signal associated with the first signal. In some embodiments, the main transmitter 102 and the replica transmitter 104 can both receive at least one input from a pre-driver 103 that controls the transmission characteristics/parameters of the main transmitter 102 and the replica transmitter 104. The replica transmitter 104 can be configured to generate a replica signal that comprises an identical, near-identical, or scaled and/or shifted version of the first signal.

The transceiver 101 includes an edge rate controller 122 that is communicatively coupled to the main transmitter 102. The edge rate controller 122 is configured to control an edge rate parameter (e.g., edge rate, slew rate, etc.) of the first signal. For example, the edge rate controller 122 can control the edge rate parameter of the first signal by tuning an input parameter of the main transmitter 102. In embodiments, the edge rate controller 122 (or a second edge rate controller) is communicatively coupled to the replica transmitter 104 and configured to control an edge rate parameter of the replica signal (e.g., in a similar manner to controlling the edge rate parameter of the first signal). The edge rate controller 122 can include a tunable component 123 (e.g., a tunable capacitor, a tunable resistor, or another tunable electronic component). The edge rate controller 122 can be under computer control (e.g., controlled by controller 126 shown on FIG. 2) and/or driven by one or more outputs of the transceiver 101 (e.g., driven according to a signal parameter measured at output 108, output 110, or output 114).

The transceiver 101 also includes a subtractor 106 that is communicatively coupled to the transmission link 112 and to an output 110 of the replica transmitter 104. The subtractor 106 is configured to subtract the replica signal (e.g., a data signal including forward channel data or an approximation of the forward channel data) from a signal (e.g., a data signal including total channel data) received via the transmission link 112. In this manner, the subtractor 106 implements receiver functionality of the transceiver 101. For example, the subtractor 106 can be configured to perform echo cancellation by subtracting the replica signal (e.g., an approximation of an echo or reflection of the first signal) from the signal received via the transmission link 112. The subtractor 106 outputs a difference signal that includes an isolated or nearly isolated data signal received via the transmission link 112 (e.g., the subtractor 106 outputs a data signal including reverse channel data received from device 118). In some embodiments, the subtractor 106 includes a programmable gain amplifier and one or more suitable equalizer circuits (e.g., continuous time linear equalizer (CTLE), decision feedback equalizer [DFE], etc.).

The subtractor 106 has a bandwidth controller 124 communicatively coupled to an output 114 of the subtractor 106. The bandwidth controller 124 is configured to control a bandwidth parameter (e.g., signal bandwidth) of the difference signal received from the output 114 of the subtractor 106. For example, the bandwidth controller 124 can include a tunable component 125 (e.g., a tunable capacitor, a tunable resistor, or another tunable electronic component) coupled to the output 114 of the controller 124. The bandwidth controller 124 can be under computer control (e.g., controlled by controller 126 shown on FIG. 2) and/or driven by one or more outputs of the transceiver 101 (e.g., driven according to a signal parameter measured at output 114).

Figure 2:
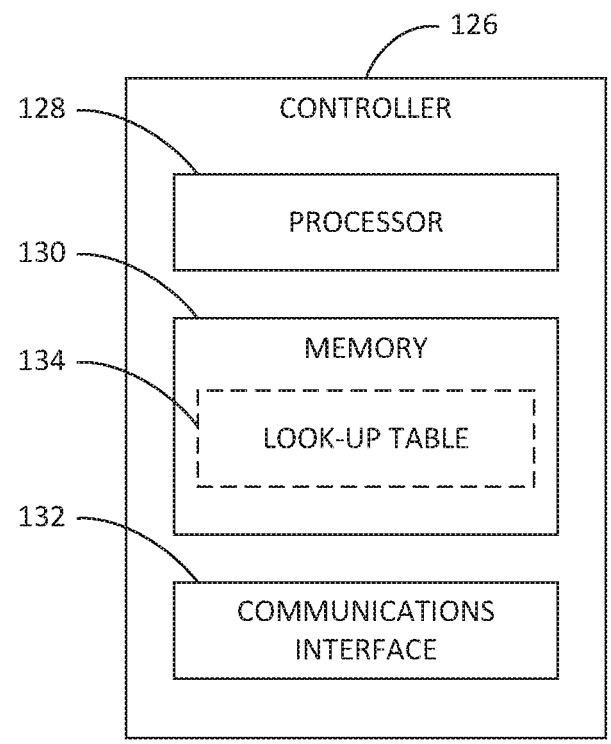
FIG. 2 is a block diagram illustrating a controller for a configurable bidirectional transceiver, such as the configurable bidirectional transceiver of FIG. 1, in accordance with an example implementation of the present disclosure.

The transceiver 101, including some or all of its components, can operate under computer control. For example, FIG. 2 shows a controller 126 configured to interface with the edge rate controller 122, the bandwidth controller 124, the peak detector 116, the pre-driver 103, the main transmitter 102, the replica transmitter 104, the subtractor 106, and/or other components of the transceiver 101. In some embodiments, the transceiver 101 includes the controller 100. In other embodiments, the controller 126 can be communicatively coupled to the transceiver 101. A processor 128 can be included with or in a controller 126 to control the components and functions of the transceiver 101 and/or communication system 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the transceiver 101. In the case of a software implementation, the module, functionality, or logic represents program code (e.g., algorithms embodied in a non-transitory computer readable medium) that performs specified tasks when executed on a processor (e.g., central processing unit (CPU) or CPUs). The program code can be stored in one or more non-transitory computer-readable memory devices or media (e.g., internal memory and/or one or more tangible media), and so on. For example, memory may include but is not limited to volatile memory, non-volatile memory, Flash memory, SRAM, DRAM, RAM and ROM. The structures, functions, approaches, and techniques described herein can be implemented on a variety of commercial computing platforms having a variety of processors.

The controller 126 can include a processor 128, a memory 130, and a communications interface 132. The processor 128 provides processing functionality for at least the controller 126 and can include any number of processors, microcontrollers, circuitry, field programmable gate array (FPGA) or other processing systems, and resident or external memory for storing data, executable code, and other information accessed or generated by the controller 126. The processor 128 can execute one or more software programs embodied in a non-transitory computer readable medium that implement techniques described herein. The processor 128 is not limited by the materials from which it is formed or the processing mechanisms employed therein and, as such, can be implemented via semiconductor(s) and/or transistors (e.g., using electronic integrated circuit (IC) components), and so forth.

The controller 126 may include a memory 130 (e.g., Flash memory, RAM, SRAM, DRAM, ROM, etc.). The memory 130 can be an example of tangible, computer-readable storage medium that provides storage functionality to store various data and or program code associated with operation of the controller 126, such as software programs and/or code segments, or other data to instruct the processor 128, and possibly other components of the transceiver 101/controller 126, to perform the functionality described herein. Thus, the memory 130 can store data, such as a program of instructions for operating the transceiver 101 (including its components), and so forth. It should be noted that while a single memory 130 is described, a wide variety of types and combinations of memory (e.g., tangible, non-transitory memory) can be employed. The memory 130 can be integral with the processor 128, can comprise stand-alone memory, or can be a combination of both.

Some examples of the memory 130 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the transceiver 101 and/or the memory 130 can include removable integrated circuit card (ICC) memory, such as memory provided by a subscriber identity module (SIM) card, a universal subscriber identity module (USIM) card, a universal integrated circuit card (UICC), and so on.

The controller 126 may include a communications interface 132. The communications interface 132 can be operatively configured to communicate with components of the transceiver 101. For example, the communications interface 132 can be configured to transmit data for storage in the transceiver 101, retrieve data from storage in the transceiver 101, and so forth. The communications interface 132 can also be communicatively coupled with the processor 128 to facilitate data transfer between components of the transceiver 101 and the processor 128 (e.g., for communicating inputs to the processor 128 received from a device communicatively coupled with the transceiver 101/controller 126). It should be noted that while the communications interface 132 is described as a component of controller 126, one or more components of the communications interface 132 can be implemented as external components communicatively coupled to the transceiver 101 via a wired and/or wireless connection. The transceiver 101 can also include and/or connect to one or more input/output (I/O) devices (e.g., via the communications interface 132), such as a display, a mouse, a touchpad, a touchscreen, a keyboard, a microphone (e.g., for voice commands) and so on.

The communications interface 132 and/or the processor 128 can be configured to communicate with a variety of different networks, such as a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 132 can be configured to communicate with a single network or multiple networks across different access points. In a specific embodiment, a communications interface 132 can transmit information from the controller 126 to an external device (e.g., a cell phone, a computer connected to a WiFi network, cloud storage, etc.). In another specific embodiment, a communications interface 132 can receive information from an external device (e.g., a cell phone, a computer connected to a WiFi network, cloud storage, etc.).

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Referring again to FIG. 1, the transceiver 101 may be configured to monitor at least one signal parameter (e.g., peak-to-peak amplitude) of the difference signal output by the subtractor 106 and configured to control edge rate and/or bandwidth parameters of transmitted and received signals based upon the signal parameter. In an embodiment, the subtractor 106 is communicatively coupled to a peak detector 116. The peak detector 116 is configured to measure at least one signal parameter (e.g., peak-to-peak (p-p) amplitude) of the difference signal. The peak detector 116 can be configured to generate a parameter signal (e.g., a peak signal) representing the measured signal parameter (e.g., the p-p amplitude). The parameter signal (or the measured signal parameter) can be utilized to tune (e.g., adjust, modify, control, etc.) one or more parameters of the main transmitter 102 and/or the replica transmitter 104. For example, a tuned parameter can include an amplitude, edge rate, bandwidth, peak, delay, combinations thereof, and so forth.

In an embodiment, the main transmitter 102 is an edge rate programmable transmitter and the subtractor 106 functions as a bandwidth programmable receiver. The main transmitter 102 and the subtractor 106 are programmed according to the data rates in both directions (e.g., forward channel (transmitting) and reverse channel (receiving) directions). Reducing an edge rate parameter of the first signal generated at the main transmitter 102 can reduce reflections and high-frequency ringing; however, doing so can limit the data rate. Similarly, reducing the bandwidth of the difference signal can filter high frequency components; however, doing so can also affect the data rate. The edge rate controller 122 and the bandwidth controller 124 can be controlled or automatically adjustable (e.g., self-adjusting) to maintain link performance without overly reducing the data rate of the forward and reverse channels of the communication system 100. In embodiments, the edge rate controller 122 is configured to control the edge rate parameter of the first signal and/or the replica signal based on the signal parameter measured by the peak detector 116. The band width controller 124 can also be configured to control the bandwidth of the difference signal output by the subtractor 106 based on the signal parameter measured by the peak detector 116 and/or based upon an edge rate or data rate of transceiver 101.

Figure 3:
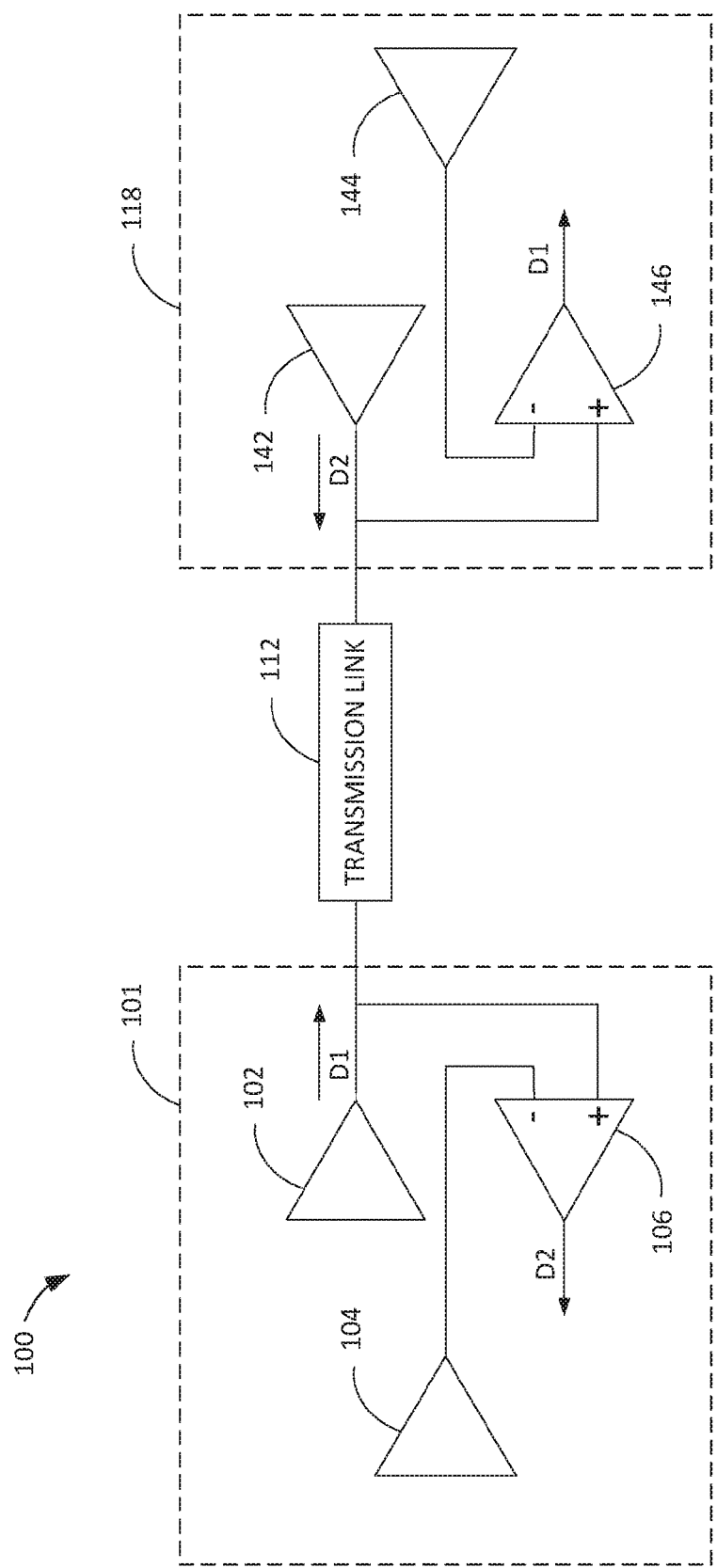
FIG. 3 is a block diagram illustrating a communication system that includes two configurable bidirectional transceivers, such as the configurable bidirectional transceiver of FIG. 1, in accordance with an example implementation of the present disclosure.

FIG. 3 illustrates an embodiment of the communication system 100 configured as a full duplex communication system. For example, the device 118 can include a second transceiver structured similarly to the transceiver 101. In this embodiment, the device 118 can include a main transmitter 142, a replica transmitter 144, a subtractor 146, and possibly other components like those of transceiver 101 in an identical or similar structural arrangement. If the data rate of transmitter 102 in a first direction D1 is kept constant (or at maximum), the data rate in the other direction D2 depends on the link quality (e.g., attenuation, return loss, etc.). The edge rate of transmitter 142 and the bandwidth of subtractor 106 can be programmed based on the link quality (e.g., based on an eye opening or bit error rate (BER) determined by the controller 126). If the link is desired to be symmetrical, the edge rate parameters of transmitter 102 and transmitter 142 and the bandwidth parameters subtractor 106 and subtractor 146 can be programmed similarly (e.g., set to the same or nearly same edge rates and bandwidths).

In some embodiments, the controller 126 is configured to tune the edge rate controller 122 and/or the bandwidth controller 124 based on at least one signal parameter measured by the peak detector 116. For example, controller 126 can be configured to reduce the edge rate of transmitter 102, via edge rate controller 122, until a target p-p amplitude is reached at the output 114 of the subtractor 116. In an embodiment, the controller 126 is configured to access a look-up table 134 in the memory 130 to determine a data rate corresponding to this edge rate. The controller 126 is then configured to adjust a bandwidth parameter of 146, via the bandwidth controller 124, based upon the data rate determined by the controller 126. Alternatively, receiver of 118 can detect incoming data rate and adjust its bandwidth accordingly.

In some embodiments, the subtractor 106 is configured to adapt its gain and equalizer coefficients while signals from transmitter 142 are transmitted (e.g., in direction D2) and channel data in direction D1 is idle. After the adaptation phase is completed, the subtractor can set its parameters (e.g., gain, etc.) such that a predefined swing is obtained at its output. The same gain and equalizer settings may be used while measuring the residual noise (or echo) resulting from transmitter 102. The transceiver 101 and the device 118 (e.g., the second transceiver) can be configured to implement a handshaking protocol to enable and disable D1 or D2 channel during the calibration.

Once the transmitter edge rate and the receiver bandwidth are determined, the transceiver 101 can be configured to match the replica transmitter 104 output to the transmitter 102 output. The transmitter 102 may achieve a low output capacitance and a wide range of edge rate control at the same time. In an embodiment, edge rate controller 122 is configured to achieve a low output capacitance by programming the edge rate of the pre-driver 103 driving the main transmitter 102 or the replica transmitter 104.

In an embodiment, the controller 126 is configured to monitor the final driver stage and lower the pre-driver amplitude until the transmitter 102 output begins to decrease. This way, final stage is not saturated and edge rate can be controlled at the input of driver not at its output. For example, the peak detector 116 can be configured to monitor the transmitter 102 output while keeping the replica transmitter 104 in a powered down state. The controller 126 can be configured to monitor the final driver stage based upon a signal parameter (e.g., p-p amplitude) measured by the peak detector 116 and can lower the pre-driver amplitude until the signal parameter meets a threshold signal parameter. In implementations, this feedback process is applied at start up while there is no transmission from the other side. In a feedforward method, the controller 126 can be configured to detect a DC value of pre-driver input amplitude that does not saturate the final stage, which can cause a few percent of the tail current to flow into the off transistor of a switching pair.

In another embodiment, the controller 126 can be configured to determine the pre-driver 103 amplitude based on a stored value in the look-up table 134 corresponding to a selected transmitter 102 output amplitude. This method can be applied if the saturation voltage does not change over process corners in the selected process. However, saturation voltage may change with temperature. The bias current $I_{PRE}$ can be configured to track the saturation voltage of final driver over temperature.

Figure 4:
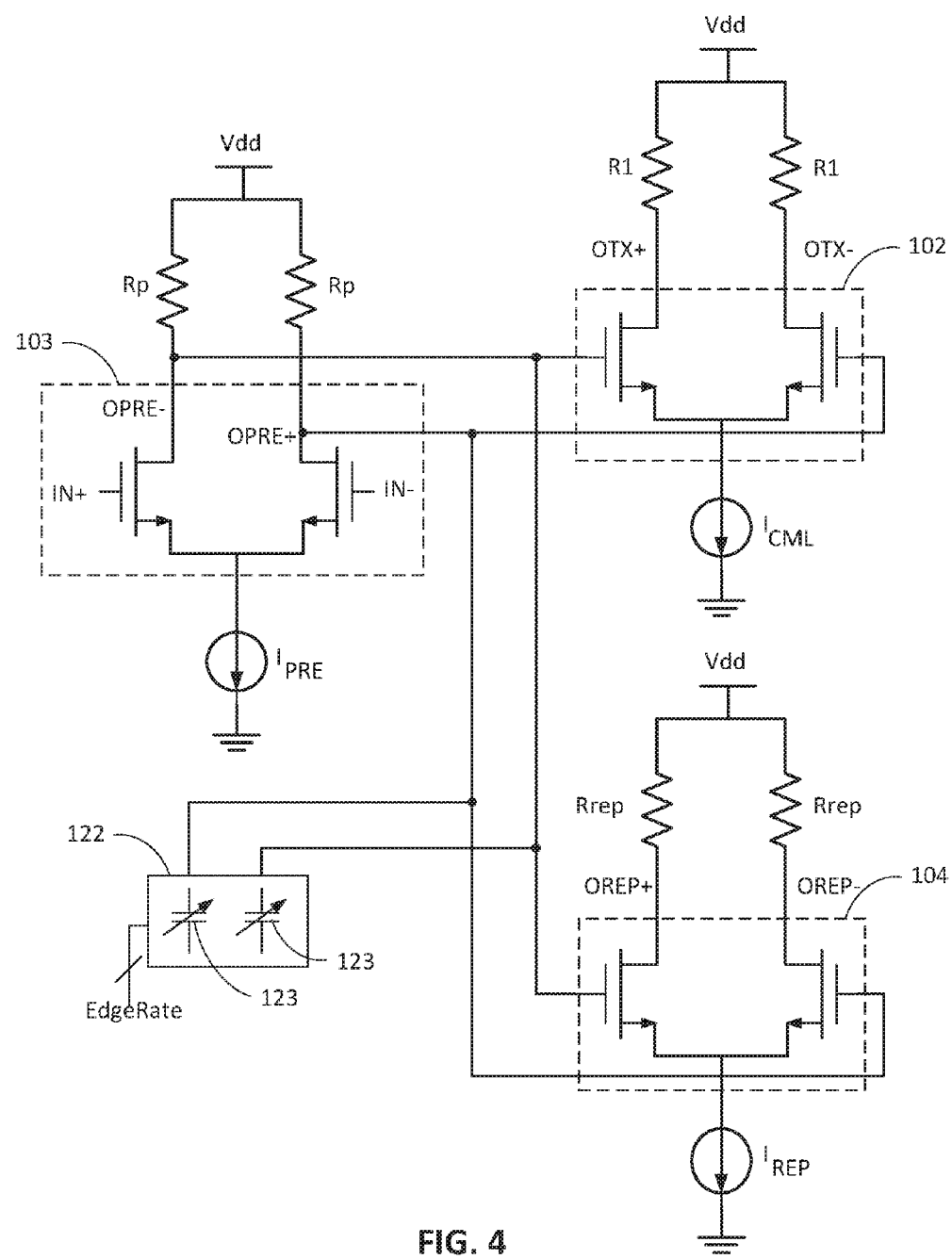
FIG. 4 is a circuit diagram illustrating circuitry for a transmitter circuit of a configurable bidirectional transceiver, such as the configurable bidirectional transceiver of FIG. 1, in accordance with an example implementation of the present disclosure.

Referring to FIG. 4, the controller 126 can be configured to set the pre-driver 103 bias current $I_{PRE}$ based on the current $I_{CML}$ through the main transmitter 102. The pre-driver 103 bias current $I_{PRE}$ is a scaled version of $I_{CML}$. Similarly, a resistive element Rrep of the replica transmitter 104 is the scaled version of a resistive element R1. In an implementation, the resistive element R1 is a fifty Ohm (50-Ohm) resistor. However, it is understood that the resistive element R1 can have other resistive values in accordance with the design and configuration of the transceiver 101. The resistive elements R1 and Rrep are calibrated in an implementation. However, it is understood that calibration may not be mandatory depending on the process technology.

In the embodiment shown in FIG. 4, the edge rate controller 122 signal the capacitance at an output of the pre-driver 103, thereby controlling an edge rate parameter of the pre-driver 103 and therefore an edge rate parameter of the main transmitter 102 and/or the replica transmitter 104. For example, the edge rate controller 122 can include at least one tunable capacitor. Tunable capacitors can be formed with different types of capacitors (e.g., metal-insulator-metal capacitors, MOS device capacitances, etc.).

Figure 5:
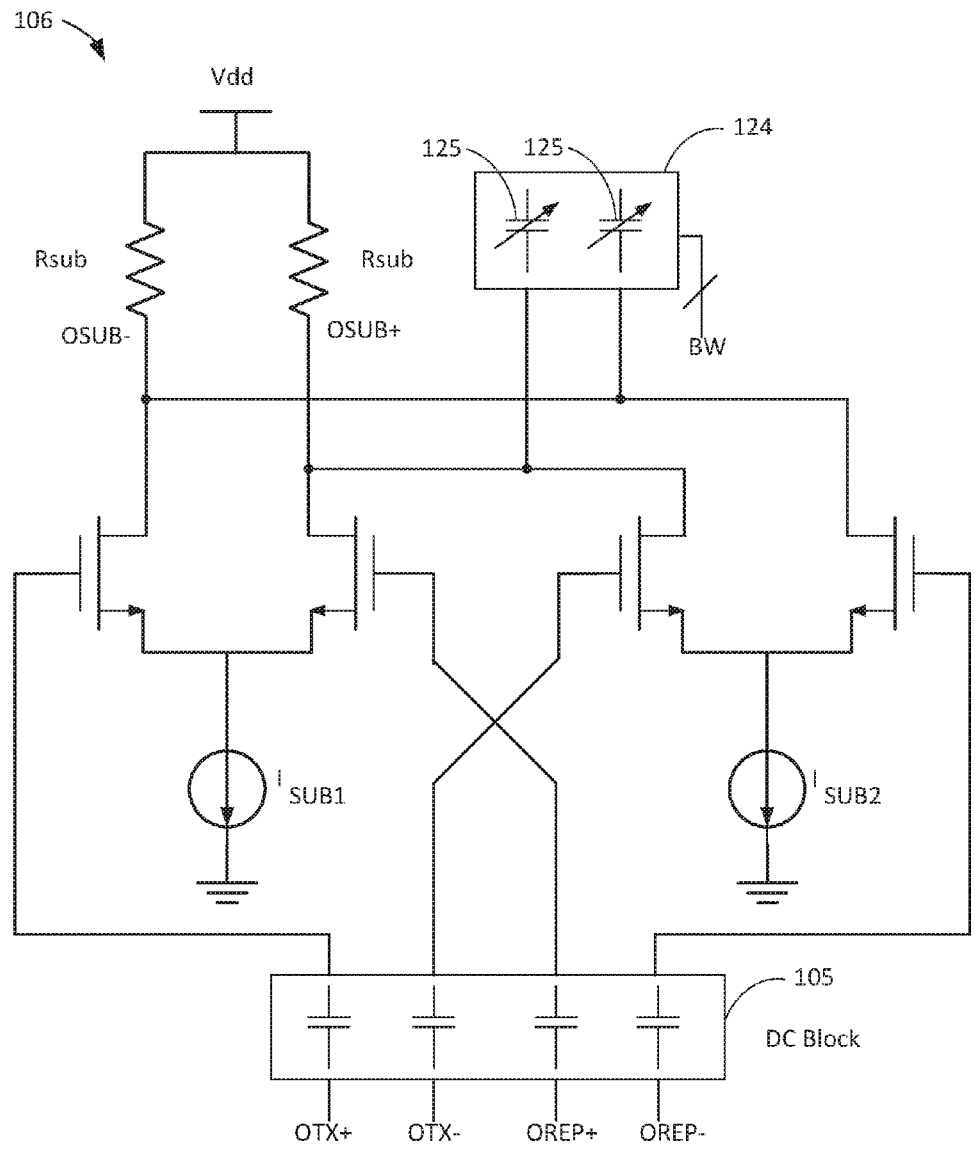
FIG. 5 is a circuit diagram illustrating circuitry for a subtractor circuit of a configurable bidirectional transceiver, such as the configurable bidirectional transceiver of FIG. 1, in accordance with an example implementation of the present disclosure.

FIG. 5 illustrates an embodiment of the subtractor 106 and bandwidth controller 124. The subtractor 106 subtracts the replica signal from the first signal and filters out high frequency components. For example, as shown in FIG. 5, the subtractor 106 can have a director current (DC) blocking circuit 105 at an input of the subtractor 106, between the transmitters 102 and 104 and the subtractor 106 to filter out high frequency components (e.g., DC signal components) in the first signal and the replica signal. As shown in FIG. 5, the inputs OTX+, OTX−, OREP+, and OREP− can be arranged to support differential and single-ended communication links. In differential operation, current sources ISUB1 and ISUB2 are both turned on. In single-ended operation, one of the current sources, ISUB1 or ISUB2, is turned on depending on which single-ended output of the subtractor 106 is being used.

Figure 6:
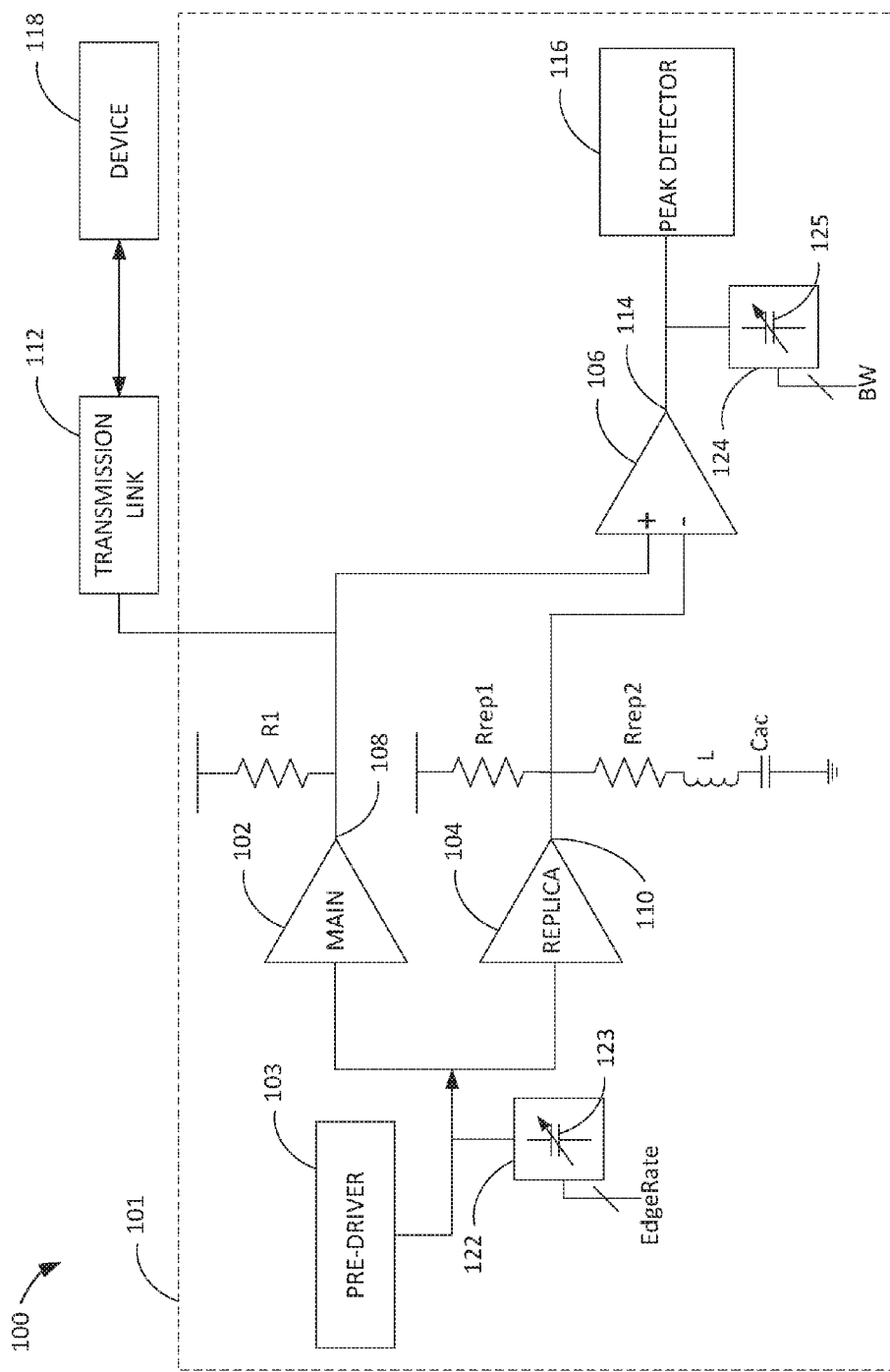
FIG. 6 is a block diagram illustrating a communication system that includes a configurable bidirectional transceiver, in accordance with an example implementation of the present disclosure.

In another embodiment, the transceiver 101 can employ a termination element for the replica transmitter 104 to better match the main transmitter 102 loading to the replica transmitter loading 104. In an implementation, the main transmitter 102 output is loaded by package inductance in series characteristic impedance (e.g., a fifty Ohm (50-Ohm) link impedance, or the like). In some embodiments, as shown in FIG. 6, an inductor L in series with a lower resistive element Rrep 2 is coupled to an upper resistive element Rrep 1 to mitigate a package inductance effect that can result in lower residual noise. This inductor L can be tuned by various suitable methods to control the peaking of replica transmitter 104. The transceiver 101 can also include a capacitor Cac in series with the inductor L to block DC portions of the replica signal. However, the capacitor Cac may not be employed in some implementations, e.g., when the inductor L is tied to a supply voltage instead of ground.

In some embodiments, the controller 126 can be configured to perform a lock and eye opening algorithm to determine whether to lower or increase data rate during a calibration at power-up. For example, the controller 126 can be configured to set the edge rate and bandwidth parameters to a highest rate in both forward and reverse channel directions. The controller 126 can be configured to decrease reverse channel speed (and adjust the transceiver 101 configurations accordingly) until both sides lock without errors with acceptable eye opening. In another implementation, the controller 126 can set the edge rate and bandwidth parameters to achieve a highest data rate in a forward channel direction and a lowest data rate in a reverse channel direction. The controller 126 can be configured to then increase the reverse channel to a maximum setting at which the transmission link 112 still performs within an acceptable margin of error (e.g., below a threshold BER).

Example Processes

Figure 7A:
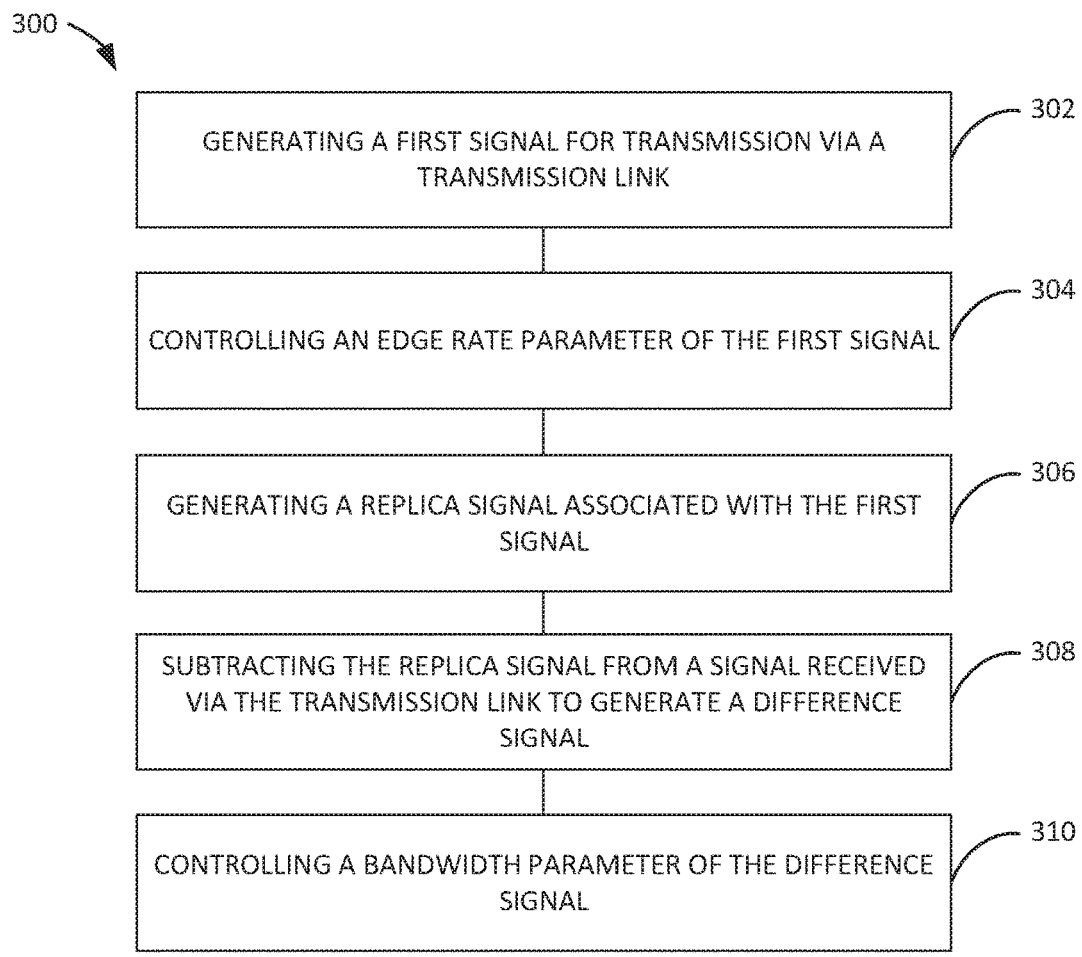
FIG. 7A is a flow diagram illustrating a process for controlling an edge rate parameter and a bandwidth parameter of a configurable bidirectional transceiver, such as the configurable bidirectional transceiver of FIG. 1 or FIG. 6, in accordance with an example implementation of the present disclosure.
Figure 7B:
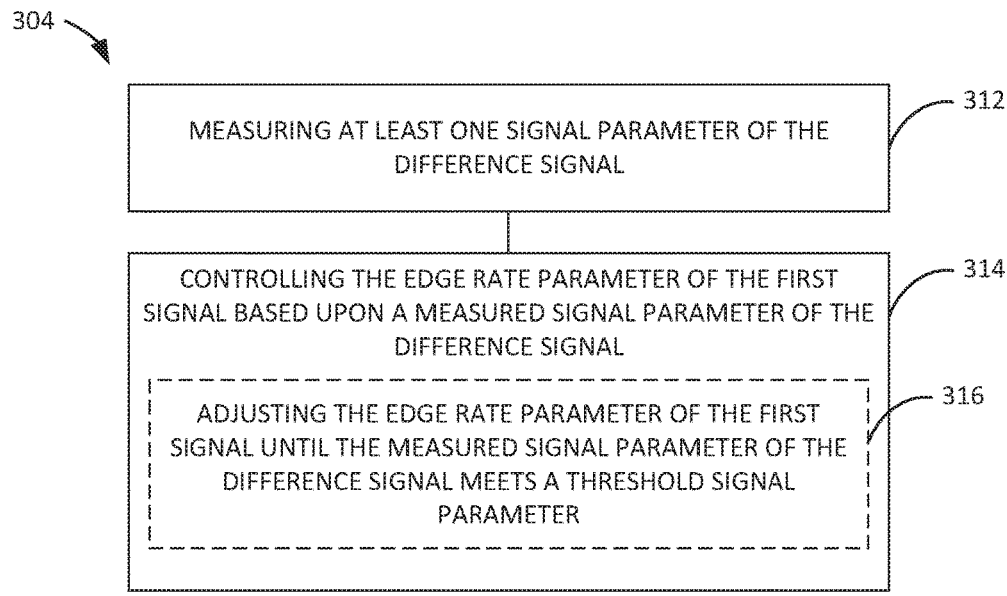
FIG. 7B is a flow diagram illustrating a process for controlling an edge rate parameter and a bandwidth parameter of a configurable bidirectional transceiver, such as the configurable bidirectional transceiver of FIG. 1 or FIG. 6, in accordance with an example implementation of the present disclosure.
Figure 7C:
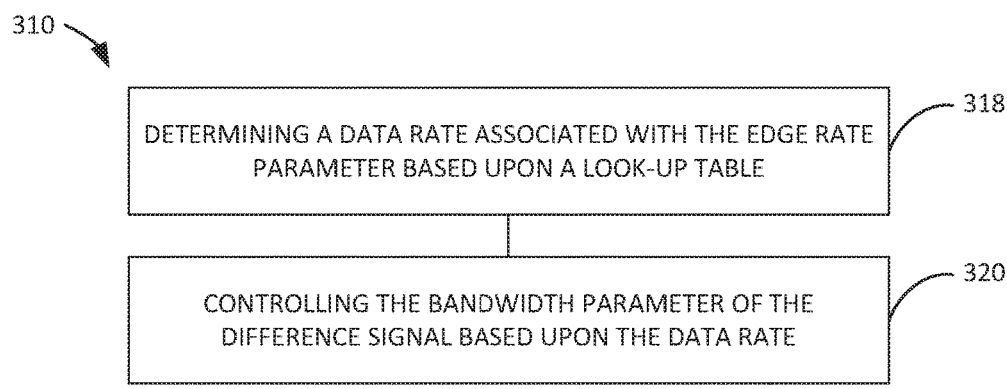
FIG. 7C is a flow diagram illustrating a process for controlling an edge rate parameter and a bandwidth parameter of a configurable bidirectional transceiver, such as the configurable bidirectional transceiver of FIG. 1 or FIG. 6, in accordance with an example implementation of the present disclosure.

FIGS. 7A through 7C illustrate example implementations of a process 300 that employs techniques described herein to control edge rate and bandwidth parameters of a configurable transceiver, such as the configurable transceiver 101 of the communication system 100 illustrated in FIGS. 1 through 6. In general, operations of process 300 may be performed in an arbitrary order, unless otherwise provided in the claims.

As shown in FIG. 7A, process 300 includes generating a first signal for transmission via a transmission link 112 (block 302). For example, the main transmitter 102 of transceiver 101 can generate the first signal for transmission via the transmission link 112. An edge rate parameter of the first signal 304 is controlled to affect a forward channel (e.g., transmitting) data rate (block 304). For example, the edge rate controller 124 of transceiver 101 can control the edge rate parameter of the first signal by tuning an input parameter of the main transmitter 102.

A replica signal associated by the first signal is generated (block 306). For example, the replica transmitter 104 of the transceiver 101 can generate the replica signal. In implementations, the replica signal comprises an identical, near-identical, or scaled and/or shifted version of the first signal. The edge rate controller 122 may also control an edge rate parameter of the replica signal (e.g., in a similar manner to controlling the edge rate parameter of the first signal).

The replica signal can be subtracted from a signal received via the transmission link 112 to generate a difference signal (block 308). For example, the subtractor 106 of transceiver 101 can subtract the replica signal (e.g., a data signal including forward channel data or an approximation of the forward channel data, D1 in FIG. 3) from a signal (e.g., a data signal including total channel data) received via the transmission link 112. The subtractor 106 outputs a difference signal that includes an isolated or nearly isolated data signal received via the transmission link 112 (e.g., the subtractor 106 outputs a data signal including reverse channel data received from device 118, D2 in FIG. 3). A bandwidth parameter of the difference signal is controlled to affect a reverse channel (e.g., receiving) data rate (block 310). For example, the bandwidth controller 124 of transceiver 101 can control a bandwidth parameter of the difference signal received from the output 114 of the subtractor 106.

In some implementations, the edge rate parameter and/or the bandwidth parameter are controlled based on one or more signal parameters of the difference signal. For example, as shown in FIG. 7B, the process 300 can further include measuring at least one signal parameter of the difference signal (312). In implementations, the peak detector 116 of the transceiver can measure the signal parameter (e.g., p-p amplitude) of the difference signal at the output 114 of the subtractor. The edge rate parameter of the first signal can be controlled based upon the measured signal parameter (block 314). For example, the edge rate controller 122 can control (or be adjusted to control) the edge rate parameter of the first signal based on the measured signal parameter. In some implementations, the edge rate parameter of the first signal is adjusted (e.g., reduced) until the signal parameter of the difference signal meets a threshold signal parameter (e.g., a threshold p-p amplitude) (block 316). The bandwidth parameter may be controlled based on the adjusted edge rate parameter. For example, as shown in FIG. 7C, the process 300 can include determining a data rate associated with the edge rate parameter based upon a look-up table (block 318). In implementations, the controller 126 can access a look-up table to determine a data rate that corresponds to the adjusted edge rate parameter of the first signal. The bandwidth parameter of the difference signal can be controlled based upon the determined data rate (block 320). For example, the bandwidth controller 124 can control (or can be adjusted to control) the bandwidth of the difference signal.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A configurable transceiver, comprising:
a first transmitter configured to generate a first signal for transmission via a transmission link;
a second transmitter configured to generate a replica signal associated with the first signal;
a subtractor communicatively coupled to the transmission link and to an output of the second transmitter, the subtractor configured to subtract the replica signal from a signal received via the transmission link to generate a difference signal;
an edge rate controller communicatively coupled to the first transmitter and configured to control an edge rate parameter of the first signal generated by the first transmitter based upon at least one signal parameter of the difference signal;
a transceiver controller communicatively coupled to the edge rate controller and configured to determine a data rate associated with the edge rate parameter; and
a bandwidth controller communicatively coupled to an output of the subtractor and the transceiver controller, the bandwidth controller configured to control a bandwidth parameter of the difference signal received from the output of the subtractor based upon the at least one signal parameter of the difference signal and the data rate determined by the transceiver controller.

2. The configurable transceiver of claim 1, wherein the edge rate controller is communicatively coupled to the second transmitter and configured to control an edge rate parameter of the replica signal.

3. The configurable transceiver of claim 1, wherein the second transmitter is tuned based upon the at least one signal parameter of the difference signal.

4. The configurable transceiver of claim 1, wherein the edge rate controller is configured to adjust the edge rate parameter of the first signal until the at least one signal parameter of the difference signal meets a threshold signal parameter.

5. The configurable transceiver of claim 1, wherein the transceiver controller comprises a processor and a memory, the processor and is configured to determine the data rate associated with the edge rate parameter based upon a look-up table stored by the memory.

6. The configurable transceiver of claim 1, wherein the edge rate controller includes at least one of a tunable capacitor or a tunable resistor.

7. The configurable transceiver of claim 1, wherein the bandwidth controller includes at least one of a tunable capacitor or a tunable resistor.

8. The configurable transceiver of claim 1, further comprising a peak detector communicatively coupled to an output of the subtractor and configured to generate the at least one signal parameter of the difference signal.

9. A communication system, comprising:
a device;
a transmission link; and
a transceiver configured to communication with the device via the transmission link, the transceiver including:
a first transmitter configured to generate a first signal for transmission via the transmission link;
a second transmitter configured to generate a replica signal associated with the first signal;
a subtractor communicatively coupled to the transmission link and to an output of the second transmitter, the subtractor configured to subtract the replica signal from a signal received via the transmission link to generate a difference signal;
an edge rate controller communicatively coupled to the first transmitter and configured to control an edge rate parameter of the first signal generated by the first transmitter based upon at least one signal parameter of the difference signal;
a transceiver controller communicatively coupled to the edge rate controller and configured to determine a data rate associated with the edge rate parameter; and
a bandwidth controller communicatively coupled to an output of the subtractor and the transceiver controller, the bandwidth controller configured to control a bandwidth parameter of the difference signal received from the output of the subtractor based upon the at least one signal parameter of the difference signal and the date rate determined by the transceiver controller.

10. The communication system of claim 9, wherein the edge rate controller is communicatively coupled to the second transmitter and configured to control an edge rate parameter of the replica signal.

11. The communication system of claim 9, wherein the second transmitter is tuned based upon the at least one signal parameter of the difference signal.

12. The communication system of claim 9, wherein the edge rate controller is configured to adjust the edge rate parameter of the first signal until the at least one signal parameter of the difference signal meets a threshold signal parameter.

13. The communication system of claim 1, wherein the transceiver controller comprises a processor and a memory and is configured to determine the data rate associated with the edge rate parameter based upon a look-up table stored by the memory.

14. The communication system of claim 9, wherein the bandwidth controller is configured to control the bandwidth parameter of the difference signal received from the output of the subtractor based on a data rate associated with at least one of the first signal and the signal received via the transmission link.

15. The communication system of claim 9, further comprising a peak detector communicatively coupled to an output of the subtractor and configured to generate the at least one signal parameter of the difference signal.

16. A method, comprising:
generating a first signal for transmission via a transmission link;
generating a replica signal associated with the first signal;
subtracting the replica signal from a signal received via the transmission link to generate a difference signal;
generating at least one signal parameter of the difference signal;
controlling an edge rate parameter of the first signal based upon the at least one signal parameter of the difference signal;
determining a data rate associated with the edge rate parameter; and
controlling a bandwidth parameter of the difference signal based upon the at least one signal parameter of the difference signal and the determined data rate.

17. The method of claim 16, wherein controlling the edge rate parameter of the first signal based upon the at least one signal parameter of the difference signal includes:
adjusting the edge rate parameter of the first signal until the at least one signal parameter of the difference signal meets a threshold signal parameter.

18. The configurable transceiver of claim 1, wherein the bandwidth controller is configured to control the bandwidth parameter of the difference signal received from the output of the subtractor based on a data rate associated with at least one of the first signal and the signal received via the transmission link.

19. The method of claim 17, wherein controlling the bandwidth parameter of the difference signal includes:
determining the data rate associated with the edge rate parameter based upon a look-up table; and
controlling the bandwidth parameter of the difference signal based upon the data rate.

* * * * *